United States Patent
Örnerfors et al.

[11] Patent Number: 5,979,358
[45] Date of Patent: Nov. 9, 1999

[54] METHOD OF MILKING ANIMALS

[75] Inventors: Benny Örnerfors, Järfälla; Ann-Louise Hörberg, Trångsund, both of Sweden

[73] Assignee: Alfa Laval Agri AB, Tumba, Sweden

[21] Appl. No.: 08/737,718

[22] PCT Filed: May 16, 1995

[86] PCT No.: PCT/SE95/00544

§ 371 Date: Nov. 13, 1996

§ 102(e) Date: Nov. 13, 1996

[87] PCT Pub. No.: WO95/31096

PCT Pub. Date: Nov. 23, 1995

[30] Foreign Application Priority Data

May 17, 1994 [SE] Sweden ................................. 9401685

[51] Int. Cl.⁶ ....................................................... A01J 5/00
[52] U.S. Cl. ........................................................ 119/14.02
[58] Field of Search .............................. 119/14.01, 14.02, 119/14.03, 14.08, 14.18

[56] References Cited

U.S. PATENT DOCUMENTS

| | | |
|---|---|---|
| 4,011,838 | 3/1977 | Nordegren et al. . |
| 4,391,221 | 7/1983 | Hoefelmayr et al. . |
| 4,790,261 | 12/1988 | Wartenhorst . |
| 5,090,359 | 2/1992 | Pettersson et al. . |
| 5,443,035 | 8/1995 | Lind et al. ............................. 119/14.02 |
| 5,645,012 | 7/1997 | Hoefelmayr ............................ 119/14.14 |
| 5,651,329 | 7/1997 | Van Den Berg et al. ............. 119/14.02 |

FOREIGN PATENT DOCUMENTS

| | | |
|---|---|---|
| 0584890 | 3/1994 | European Pat. Off. . |
| 3609275 | 9/1987 | Germany . |
| WO 92/12625 | 8/1992 | WIPO . |

*Primary Examiner*—Thomas Price
*Attorney, Agent, or Firm*—Hovey, Williams, Timmons & Collins

[57] ABSTRACT

In a process for milking animals and with the aid of teatcup liners, each teatcup liner is brought to be cyclicly partly opened during an initial milking phase (I), when the teat in the teatcup liner still is slack, so that the teatcup liner is prevented from crawling upwards on the teat and throttle the milk passage between udder and teat. During a subsequent main phase (II) of the milking, when the teat is extended, the teatcup liner is brought to be cyclicly opened at least substantially completely. The initial phase is ended and the main phase is started when at least one monitored milking variable reaches a predetermined value. According to the invention the milking variable is the milk quantity extracted from the animal. Alternatively, further milking variables may be monitored such as the milk flow and the time from the beginning of the initial phase (I). Hereby the initial phase can be adapted to individual animals, whereby the milking time is minimized.

20 Claims, 2 Drawing Sheets

METHOD OF MILKING ANIMALS

BACKGROUND OF THE INVENTION

1. Field of the Invention

The present invention relates to a method of milking an animal, in which the animal's teats are applied in teatcup liners with tubular walls. The interior of each teatcup liner under the teat is exposed to an underpressure for extracting milk from the teat, while the wall of the teatcup liner is exposed to a cyclicly varying pressure difference between the interior of the teatcup liner under the teat and the outside of the teatcup liner, so that the teatcup liner cyclicly moves towards an open and a closed position. During an initial phase of the milking, when the milk flow is non-existent or relatively small, said pressure difference is varied such that the teatcup liners are cyclicly partly opened. During a main phase of the milking, when the milk flow is relatively large, said pressure difference is varied so that the teatcup liner is cyclicly open at least substantially completely. At least one milking variable is monitored during said initial phase, the initial phase being ended and the main phase being started when said milking variable reaches a predetermined value.

2. Description of the Prior Art

Such a milking method is known from U.S. Pat. No. 4,391,221 and intends to prevent the teatcup liners from crawling upwards on the teats, when the milk flow still is relatively small and the teats as a consequence thereof are relatively slack. Thus, it is ensured that the frictional engagement between the teatcup liners and slack teats are kept intact by not opening the teatcup liners completely during said initial phase of the milking.

A teatcup liner which has crawled upwards on its teat may throttle or even completely close the passage between the udder cistern and the teat, which results in that the milk flow from the teat is reduced or ceases.

Teatcup liner crawling can therefore result in a decreased milk yield and/or prolonged milking time. It would be possible to remedy an occurred case of teatcup liner crawling by first completely detach the teatcup liner in question from its teat and then reattach it on the teat. However, in practice it is difficult to discover teatcup liner crawlings, and consequently, it is important that these as much as possible are prevented from occurring at all.

By means of the known milking method according to U.S. Pat. No. 4,391,221 the initial phase of the milking is ended in response to the lapse of a predetermined time period, which can be chosen in the interval of 40–90 seconds, counted from the beginning of the initial phase. However, for for instance cows the time each cow will need to give such a relatively large milk flow which results in distended teats and thereby a good engagement with fully opening teatcup liners is very individual. Thus, some cows may give a large milk flow already after a few seconds of the initial phase, while other cows will give a large milk flow first after about a minute of the initial phase. Therefore, the known milking method has the disadvantage that some cows are treated during an unnecessary long initial phase, which has the consequence that the total milking time will be unnecessarily long.

Therefore it may seem to be better to control the duration of the initial phase in response to the milk flow from the teats, so that the initial phase is ended when the milk flow is large enough to indicate that the teats are extended. However, the milk flow is not a reliable indicator on how prepared a cow is for milking, since the milk flow after an initial increase again may be reduced in case the cow is not sufficiently stimulated. The reduction of the milk flow in such a case depends on that only the minor milk quantity already being in the udder cisterns is extracted, while the major milk quantity being in the alveoli of the udder still has not been released.

SUMMARY OF THE INVENTION

The object of the present invention is to achieve a milking method of the kind here present, by means of which the duration of said initial phase of the milking is adapted to each individual animal, so that the total milking time is minimized.

This object is achieved by means of a method of the kind initially described, which is characterized in that said milking variable relates to the milk quantity extracted from the animal. Hereby the advantage is obtained that the initial phase with certainty can be made relatively short for animals which are easy to stimulate and relatively long for animals which are difficult to stimulate, since extracted milk quantity constitutes a clear indication on whether the animal is prepared to be milked and the teats are extended.

Suitably at least two milking variables are monitored, the initial phase being ended when one of said two milking variables reaches a predetermined value. One of the milking variables of course relates to the milk quantity extracted from the animal while the other milking variable may relate to the milk flow from the animal's teats, or alternatively the duration of the initial phase. Hereby the duration of the initial phase for the individual animals can be controlled more accurately. Preferably a plurality of milking variables are monitored, a first milking variable relating to the milk quantity extracted from the animal, a second milking variable relating to the milk flow from the animal's teats, and a third relating to the duration of the initial phase. The initial phase is ended when one of the milking variables reaches a predetermined value. Hereby the accuracy of the duration of the initial phase for the individual animals can be further increased. In addition to monitoring the above mentioned first, second and third milking variables it would of course be conceivable to monitor further milking variables.

When milking cows suitable predetermined values for the milking variables which are monitored are dependent on several different factors, such as breed, lactation status, milk yield, milking intervals, type of milking machine to be used, etc. The predetermined values for the milking variables therefore have to be determined by means of experiments.

However, in general when milking cows the predetermined value of the milk quantity is chosen in the range of 0,2–2,0 kg, preferably 0,4–1,0 kg, the predetermined value of the milk flow in the range of 0,5–2,5 kg/minute, and the predetermined value for the duration of the initial phase in the interval of 30–100 seconds.

During the initial phase the animal may advantageously be stimulated by exposing the animal's teats to pulses having a frequency of at least 2 Hz, preferably at least 3 Hz. This relatively high pulsation frequency, normal pulsation frequency during the main phase is usually 1 Hz, has the consequence that the teatcup liners in the teatcups of the milking machine have no time to open completely, whereby the teatcup liners maintain a good frictional engagement with the teats even if the milk flow is small.

The invention is described more closely in the following with reference to the accompanying drawings.

DETAILED DESCRIPTION OF THE DRAWINGS

Figure 1:
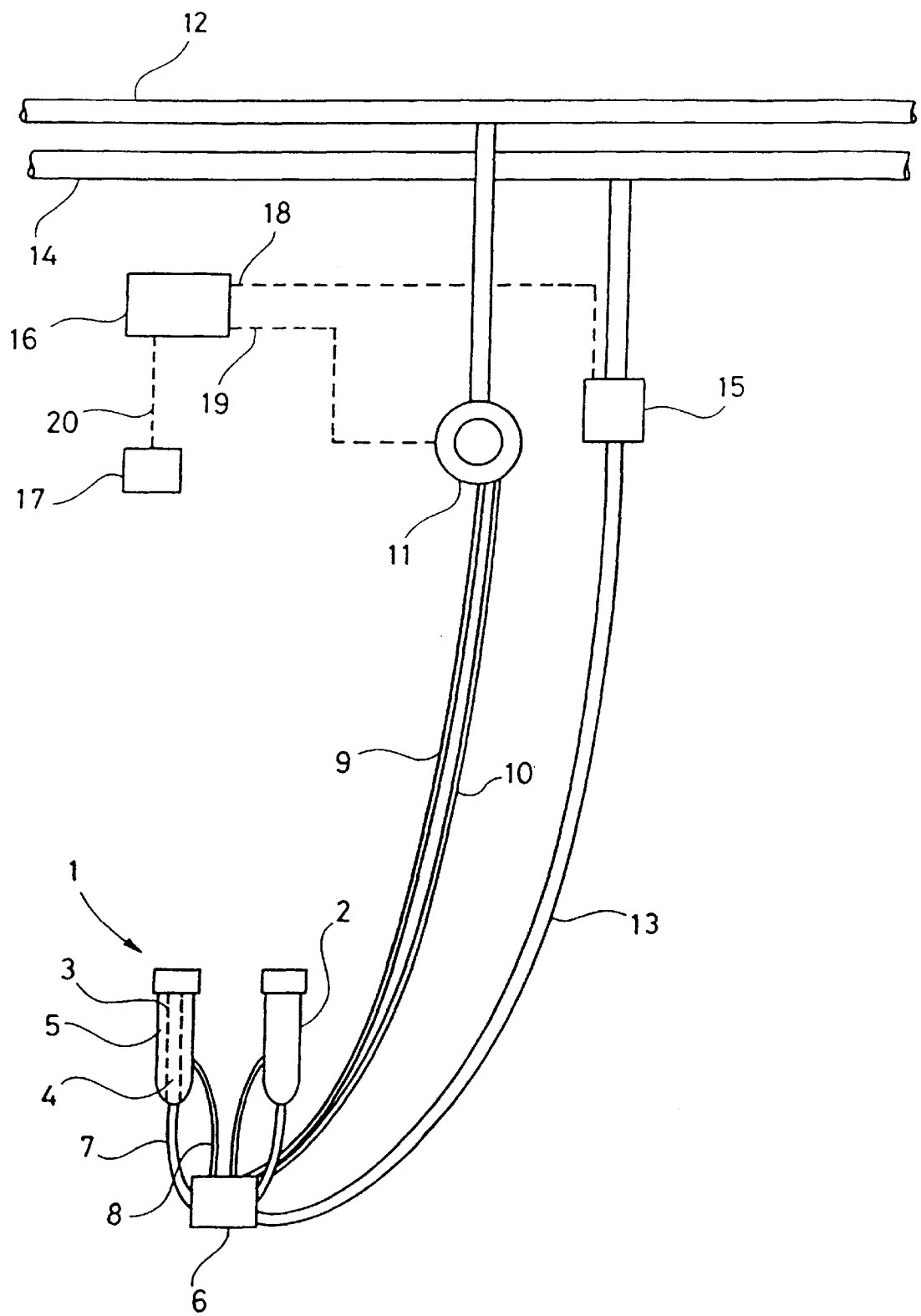
FIG. 1 is a schematic view showing a milking machine adapted to milk cows according to the method according to the present invention.

In FIG. 1 there is shown a milking machine comprising a milking means 1, for instance of the type HARMONY™, with four teatcups 2, in which teatcup liners 3 are mounted (only two teatcups are shown). Each teatcup liner 3 has an interior milk conducting passage 4 and forms with the enclosing wall of the teatcup 2 a pulsation chamber 5. A teatcup claw 6 is connected to the teatcup liners 3 via four short milk hoses 7, and to the pulsation chambers 5 via four short pulsation hoses 8. Via the teatcup claw 6 the short pulsation hoses 8 are connected in pairs to two long pulsation hoses 9, 10, which extend upwardly from the teatcup claw 6 to a battery operated electronic pulsator 11. The pulsator 11 is connected to an air pipeline 12, the interior of which is exposed to an underpressure generated by a vacuum source (not shown).

The four short milk hoses 7 are via the teatcup claw 6 connected to a long milk hose 13, which extends upwardly from the teatcup claw 6 to a milk conduit 14, the interior of which communicates with said vacuum source. In the milk hose 13 there is a flow meter 15 for sensing the milk flow.

A control unit 16, is connected to the flow meter 15, the pulsator 11 and a timer 17 via respective signal conduits 18, 19 and 20. The control unit 16 is adapted to control the pulsation frequency of the pulsator 11 in response to input data from the timer 17 and the flow meter 15. The combination of the control unit 16 and the timer 17 may for instance be of the type ALPRO™.

The milking machine functions in the following way:

The teatcups 2 are applied on a cow to be milked. During an initial phase I of the milking the control unit 16 controls the pulsator 11 so that the latter alternates between atmospheric pressure and vacuum having a high frequency of 5 Hz. Thus, the teatcup liners 3 are vibrated at the same high frequency without being completely opened, which results in an intensive stimulation of the cow's teats, and a good frictional engagement between the teatcup liners 3 and the teats, see FIGS. 2 and 3. With the aid of the timer 17 and the flow meter 15 the control unit 16 monitors the milk quantity extracted from the cow, the actual milk flow through the milk hose 15 and the time which has lapsed since the initial phase I of the milking was started.

The control unit 16 ends the initial phase I by switching the pulsator 11 from 5 Hz to a normal frequency of 1 Hz, when any of the following three conditions are fulfilled:

The milk quantity amounts to 0,6 kg.

The milk flow amounts to 1,7 kg/min.

The stimulation phase I has lasted for 70 seconds.

Figure 2:
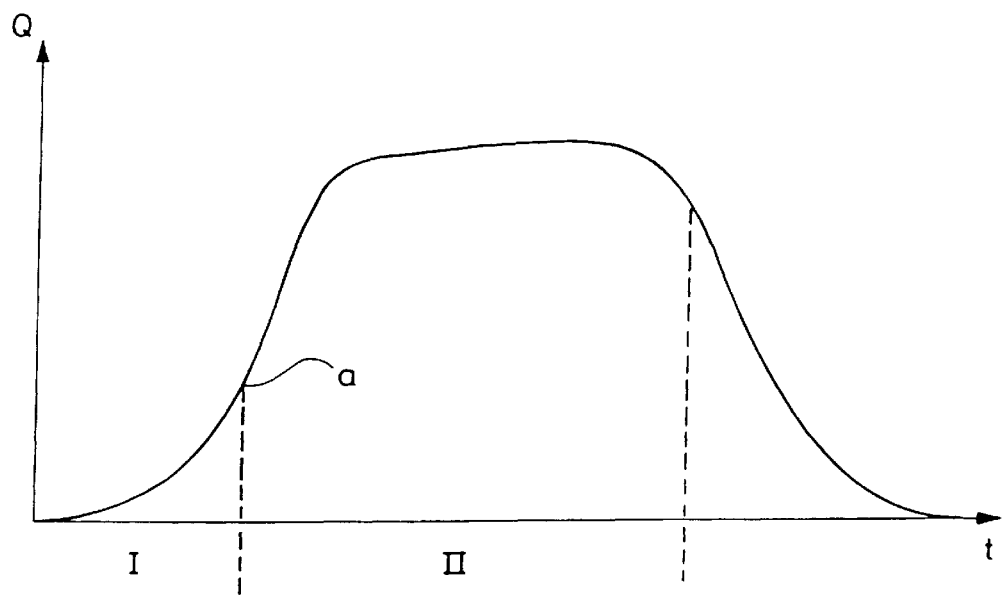
FIG. 2 is a diagram showing the variation of the milk flow Q during milking of a cow.
Figure 3:
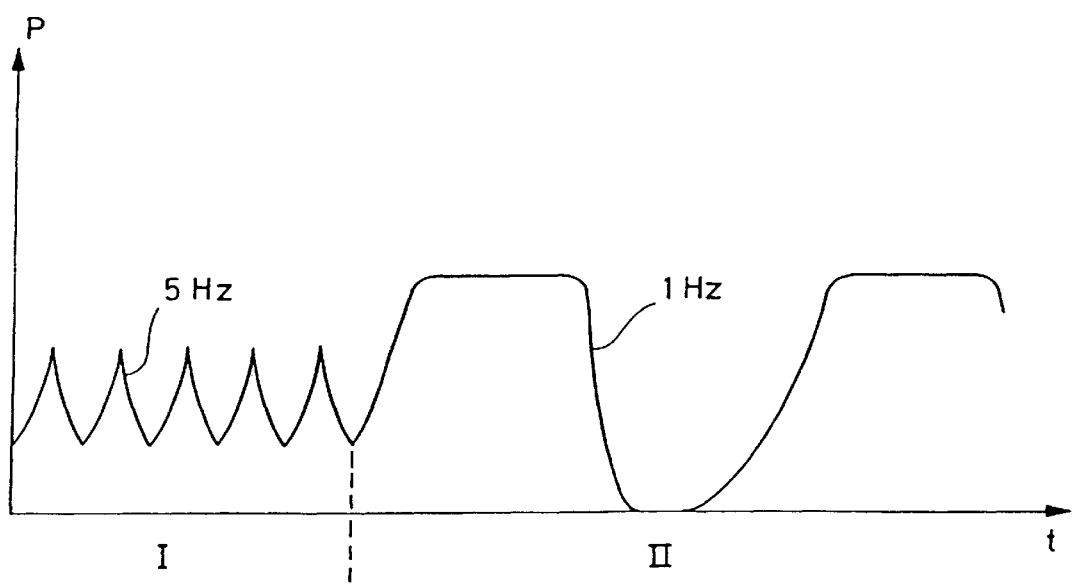
FIG. 3 is a diagram showing the pressure variations P in a teatcup of the milking machine according to FIG. 1 when a cow is milked.

In the diagram according to FIG. 2 there is shown a transition point of time a between the initial phase I and a main phase II of the milking, during which the pulsator 11 is operated at a normal frequency of 1 Hz. The transition point of time a thus is completely individual for the cow being milked and may be varied with the milking occasions for the cow. The predetermined values for the milk quantity, the milk flow and the duration of the initial phase I have been determined by means of experiments so-that when milking a herd of cows the transition point of time a is controlled by the milk quantity during the majority of the milkings, by the duration of the stimulation time I during a small number of the milkings, and by the milk flow during the remaining milkings.

The method according to the invention is well suited for automatic milking machines, which are adapted to automatically attach teatcups, milk and detach the teatcups.

We claim:

1. A method for milking an animal, comprising applying the animal's teats in teatcup liners with tubular walls, exposing the interior of each teatcup liner under the teat to an underpressure for extracting milk from the teat, while providing a cyclically varying pressure difference between the interior of the teatcup liner under the teat and the outside of the teatcup liner to cyclically move the teatcup liner towards an open and a closed position, respectively, varying said pressure difference during an initial phase of the milking, when the milk flow is non-existent or relatively small, to cyclically partly open the teatcup liners, varying said pressure difference during a main phase of the milking, when the milk flow is relatively large, to cyclically at least substantially completely open the teatcup liners, monitoring at least one milking variable during said initial phase, ending the initial phase and starting the main phase when said milking variable reaches a predetermined value, said milking variable being the milk quantity extracted from the animal.

2. The method of claim 1, wherein when milking cows the predetermined value of the milk quantity is chosen in the range of 0.2–2.0 kg.

3. The method of claim 2, wherein the predetermined value of the milk quantity is chosen in the range of 0.4–0.8 kg.

4. The method of claim 1, wherein said pressure difference is varied at a frequency which is at least 2 Hz during the initial phase.

5. The method of claim 4, wherein said frequency is at least 3 Hz.

6. A method for milking an animal, comprising applying the animal's teats in teatcup liners with tubular walls, exposing the interior of each teatcup liner under the teat to an underpressure for extracting milk from the teat, while providing a cyclically varying pressure difference between the interior of the teatcup liner under the teat and outside of the teatcup liner to cyclically move the teatcup liner towards an open and a closed position, respectively, varying said pressure difference during an initial phase of the milking, when the milk flow is non-existent or relatively small, to cyclically partly open the teatcup liners, varying said pressure difference during a main phase of the milking, when the milk flow is relatively large, to cyclically at least substantially completely open the teatcup liners, monitoring at least two milking variables during said initial phase, ending the initial phase and starting the main phase when any of said milking variables reaches a predetermined value, a first milking variable of said milking variables being the milk quantity extracted from the animal and a second milking variable of said milking variables being the milk flow from the animal's teats.

7. The method of claim 6, wherein when milking cows the predetermined value of the milk quantity is chosen in the range of 0.4–0.8 kg and the predetermined value of the milk flow is chosen in the range of 0.5–2.5 kg/minute.

8. The method of claim 7, wherein the predetermined value of the milk, quantity is chosen in the range of 0.4–0.8 kg.

9. The method of claim 6, wherein said pressure difference is varied at a frequency which is at least 2 Hz during the initial phase.

10. The method of claim 9, wherein said frequency is at least 3 Hz.

11. A method for milking an animal, comprising applying the animal's teats in teatcup liners with tubular walls, exposing the interior of each teatcup liner under the teat to an underpressure for extracting milk from the teat, while providing a cyclically varying pressure difference between the interior of the teatcup liner under the teat and the outside of the teatcup liner to cyclically move the teatcup liner towards an open and a closed position, respectively, varying said pressure difference during an initial phase of the milking, when the milk flow is non-existent or relatively small, to cyclically partly open the teatcup liners, varying said pressure difference during a main phase of the milking, when the milk flow is relatively large, to cyclically at least substantially completely open the teatcup liners, monitoring at least two milking variables during said initial phase, ending the initial phase and starting the main phase when any of said milking variables reaches a predetermined value, a first milking variable of said milking variables being the milk quantity extracted from the animal and a second milking variable of said milking variables being the time elapsed from the beginning of the initial phase.

12. The method of claim 11, wherein the milking cows the predetermined value of the milk quantity is chosen in the range of 0.2–2.0 kg and the predetermined value of the time elapsed from the beginning of the initial phase is chosen in the interval of 30–100 seconds.

13. The method of claim 12, wherein the predetermined value of the milk quantity is chosen in the range of 0.4–0.8 kg.

14. The method of claim 11, wherein said pressure difference is varied at a frequency which is at least 2 Hz during the initial phase.

15. The method of claim 14, wherein said frequency is at least 3 Hz.

16. A method for milking an animal, comprising applying the animal's teats in teatcup liners with tubular walls, exposing the interior of each teatcup liner under the teat to an underpressure for extracting milk from the teat, while providing a cyclically varying pressure difference between the interior of the teatcup liner under the teat and the outside of the teatcup liner to cyclically move the teatcup liner towards an open and a closed position, respectively, varying said pressure difference during an initial phase of the milking, when the milk flow is non-existent or relatively small, to cyclically partly open the teatcup liners, varying said pressure difference during a main phase of the milking, when the milk flow is relatively large, to cyclically at least substantially completely open the teatcup liners, monitoring a plurality of milking variables during said initial phase, ending the initial phase and starting the main phase when any of said milking variables reaches a predetermined value, a first milking variable of said milking variables being the milk quantity extracted from the animal, a second milking variable of said milking variables being the milk flow from the animal's teats and a third milking variable of said milking variables being the time elapsed from the beginning of the initial phase.

17. The method of claim 16, wherein when milking cows the predetermined value of the milk quantity is chosen in the range of 0.2–2.0 kg, the predetermined value of the milk flow is chosen in the range of 0.5–2.5 kg/minute and the predetermined value of the time elapsed from the beginning of the initial phase is chosen in the interval of 30–100 seconds.

18. The method of claim 17, wherein the predetermined value of the milk quantity is chosen in the range of 0.4–0.8 kg.

19. The method of claim 16, wherein said pressure difference is varied at a frequency which is at least 2 Hz.

20. The method of claim 19, wherein said frequency is at least 3 Hz.

* * * * *